United States Patent
Blakley, III et al.

[11] Patent Number: 6,067,623
[45] Date of Patent: May 23, 2000

[54] SYSTEM AND METHOD FOR SECURE WEB SERVER GATEWAY ACCESS USING CREDENTIAL TRANSFORM

[75] Inventors: George Robert Blakley, III; Richard Jay Cohen; Ivan Matthew Milman, all of Austin, Tex.

[73] Assignee: International Business Machines Corp., Armonk, N.Y.

[21] Appl. No.: 08/976,400

[22] Filed: Nov. 21, 1997

[51] Int. Cl.[7] .................................................. G06F 13/14
[52] U.S. Cl. ................................ 713/201; 707/9; 709/302
[58] Field of Search ................................. 713/201, 202, 713/200, 151, 152; 709/229, 226, 230, 302; 707/1, 9, 10

[56] References Cited

U.S. PATENT DOCUMENTS

| | | | |
|---|---|---|---|
| 5,586,260 | 12/1996 | Hu | 395/200.2 |
| 5,596,748 | 1/1997 | Kleewin et al. | 395/610 |
| 5,604,490 | 2/1997 | Blakley, III et al. | 713/201 |
| 5,689,638 | 11/1997 | Sadovsky | 707/9 |
| 5,872,915 | 2/1999 | Dykes et al. | 713/201 |
| 5,884,312 | 3/1999 | Dustan et al. | 707/10 |

OTHER PUBLICATIONS

Internet, *DCE/Snare™ A Security Framework for TCP/IP and Legacy Applications*, Product Overview, IntelliSoft Corporation, Jul., 1997.

Internet, *WebCrusader*, Gradient Technologies, Inc., Jul., 1997.

Internet, *DASCOM Securing the Enterprise Network*, Jul., 1997.

*Primary Examiner*—Robert W. Beausoliel, Jr.
*Assistant Examiner*—Christopher Revak
*Attorney, Agent, or Firm*—Michael R. Barre'; Mark S. Walker; Andrew J. Dillon

[57] ABSTRACT

A system and method for controlling client access to enterprise resources through a middle tier server. Enterprise resource authorizations are maintained in a middle tier server. Users authenticate with the server causing it to map and transform the client access authorization into enterprise resource credentials. Enterprise resources are accessed after authorizing using the transformed credentials.

21 Claims, 3 Drawing Sheets

SYSTEM AND METHOD FOR SECURE WEB SERVER GATEWAY ACCESS USING CREDENTIAL TRANSFORM

BACKGROUND OF THE INVENTION

1. Field of the Invention

The present invention relates to computer access security and particularly to security systems for enabling client access to server resources. In particular, it relates to the use of security credential transformation to enable access to multiple separately authenticated resources with a single authentication. More particularly, the present invention relates to access control management in a middle tier server supporting client access to enterprise resources using id mapping on credential transformation.

2. Background and Related Art

Internet technology enables users at client workstations to access data from multiple applications through a single, standard interface. A web browser enables the user to access data that has been published for access on the web. Data access is provided by and controlled by a web server. Such a server receives and responds to requests from a web client. Web servers are a class of "middle tier servers" in the increasingly common three tier internet architecture. The first tier is the client browser while the third tier is made up of a number of enterprise resource servers such as an IBM DB2 database server, or an IBM CICS transaction server. These third tier servers are often legacy computer systems that store critical corporate or enterprise data.

Secure access to enterprise resource data is essential because of the critical nature of that data. Each of the enterprise resources typically maintains its own security mechanism. The web server itself also will have a security mechanism to control access to its data and for use in creating secure communications links between the client and web server. Proliferation of access controls creates problems for the system user because he or she must remember a large number of user-id and password combinations. The appropriate id and password must be entered in order to access a particular enterprise resource frequently leading to user frustration or access failure if the wrong combination is entered.

The basic prior art approach to separate resource validation involves the web server passing authentication requests from the enterprise resource to the client. The client user must then enter the appropriate user id and password to be given access to the enterprise resource. The id and password entered are passed to the enterprise resource by the web server. This approach has the problem of requiring the user to maintain multiple ids and passwords and be prepared to supply the appropriate combination when requested. It also suffers from the stateless nature of the web server. The web server acts on each client request independently. It does not store information about the client and, in particular, does not store the userid and password used to access the enterprise resource. Each request to an enterprise resource from the web server is an independent transaction that must be authenticated. Prior art systems solve this problem by retaining the userid/password at the client during the current session to be supplied transparently back to the enterprise resource when requested. This has the disadvantage of increasing server to client network traffic. Each server to enterprise resource request generates an additional authentication request back to the client with a return response. This has the further disadvantage of increasing the opportunity for the user id and password to be compromised since they are sent across the network often.

A second prior art approach to solving the problem of controlling web server access to enterprise resources is to provide the web server itself with authorization to access the enterprise resources. This is illustrated in FIG. 2. Web browser 202 authenticates itself with web server 204 creating a session with the server. The session may be an unsecure authorized link or it may be a secure session employing a secure link based on encrypted messages according the secure socket layer (SSL) or secure hypertext transform protocol (SHTTP) protocols. Once the session is established, the client is permitted to access enterprise resources 206, 208, 210 with the web server authenticating itself with the enterprise resource (enterprise identifier or eid=MTS.)

The web server authentication approach has the disadvantage of applying a uniform security approach to all clients. Client web access may be limited to specific server applications. However, any client authorized for a particular application may access all data which that application may access based on the server identifier. This is often inconsistent with the security requirements of the enterprise resource which may control access based on the role or individual identity of the user.

A variation of the above prior art approach is to use the userid/password combination required to access the web server as the authentication pair to access the enterprise resource. This has the advantage over the previous approach of supporting individual user authorizations, but has the disadvantage of requiring uniformity of userid/password for a number of enterprise resources. Legacy applications, in particular, may not support a particular userid/password format and it may be impossible to find a common format. Use of a single userid/password combination for multiple system accesses also poses a security risk if the single set is compromised.

Various commercial products have been introduced in an attempt to solve this problem. IntraVerse NetSEAL (TM) from Dascom provides enhanced security between the client and web server or network server. It does not enhance enterprise resource authorization. WebCrusader(tm) from Gradient Technologies, Inc. provides an id mapping service that supports mapping of a web server client id to an id required for enterprise resource access. WebCrusader does not perform credential mapping, i.e. finding the appropriate credentials for a resource based on client identifier. The DCE/Snare(tm) product from IntelliSoft Corp. provides a generalized security framework for TCP/IP access to legacy applications. DCE/Snare supports authentication of client access requests and then passing ("tunneling") those requests directly to the appropriate legacy server. The product supports calling out to programs on the server for mapping the client authorization to the server authentication model. Each of these programs must be specifically developed for and reside on the referenced server. DCE/Snare provides a single default credential transformation for the telnet protocol, however, DCE/Snare requires that the user have the same telnet password on all servers.

The technical problem therefore exists of providing secure access to enterprise resources from a middle tier server that minimizes authentication demands to the client user while providing effective control over enterprise resources. In addition, the problem exists of enabling a client user to access a number of resources using a single authentication without compromising the security of the enterprise resources. Finally, the problem exists of creating a mechanism to allow a middle tier server to control authentication to enterprise resources to support client requests to which the server must respond based on enterprise resources.

SUMMARY OF THE INVENTION

The present invention is directed to a system and method for controlling middle tier server authentication to enterprise resources. The system enables maintenance of enterprise resource credentials at the middle tier server and performs id mapping and credential transform to authenticate a user with an enterprise server based on the client authorization with the middle tier server.

The present invention is directed to a method for server controlled access to a resource in response to a client access request, the method comprising the steps of: storing in the server a set of resource authorizations for a plurality of users, the storing performed by a user of a first authority level; authenticating a server access request based on a user first authorization identifier; testing the access request to determine resource access requirements; mapping the first authorization identifier to a resource authorization identifier based on the stored resource authorizations; transforming the first authorization credentials to resource authorization credentials based on the resource authorization identifier; authenticating access to the resource using the resource authorization credentials.

It is therefore an object of the present invention to enable single client authentication with access to multiple enterprise resources each having individual authorization mechanisms.

It is another object of the present invention to maintain client enterprise resource authorization control at the middle tier server.

It is yet another object of the present invention to provide a mechanism to add new enterprise resources with different authentication mechanisms and to support new secondary login mechanisms.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
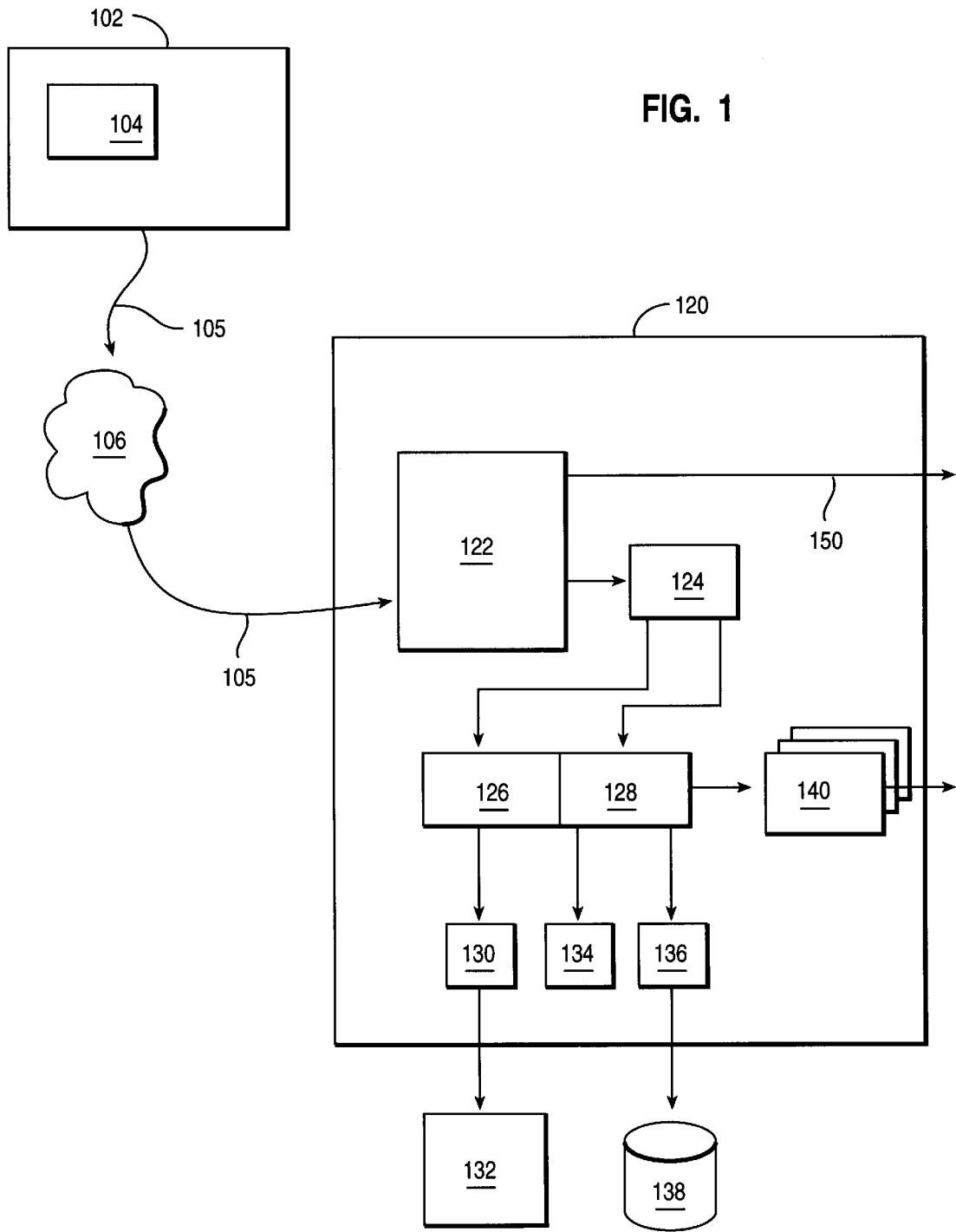
FIG. 1 is a block diagram of a computer system according to the present invention.
Figure 2:
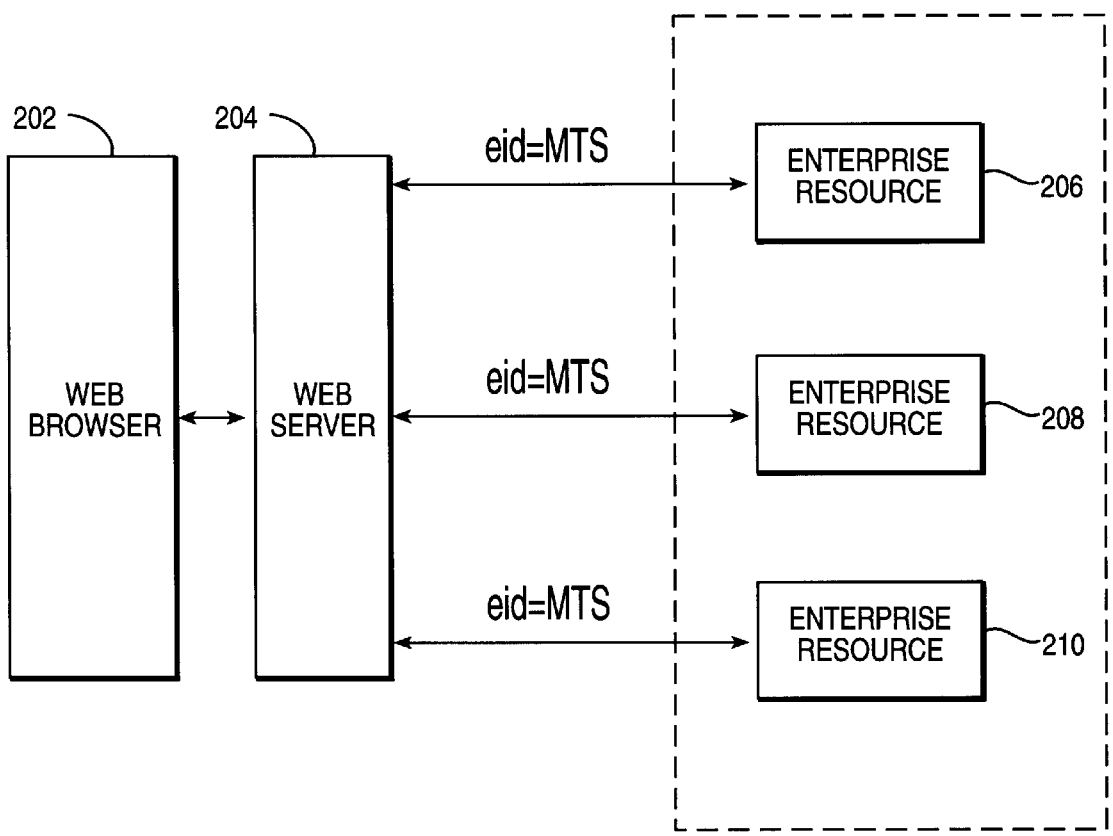
FIG. 2 is a block diagram of a prior art authentication system.

The Internet is becoming an important medium for accessing enterprise resources. Enterprise resources include databases and other programs that maintain information about an enterprise. Many of these enterprise resources are based on old technology and constitute "legacy" systems. The life of these systems is being extended through improved usability and access through the internet.

The three tiered access model is used to implement enterprise resource access. The first tier is a client system executing a "common off the shelf" (COTS), commercially available web browser such as the Netscape Navigator or Microsoft Internet Explorer. These COTS browsers are readily available and relatively easy to install and make operational on the client system.

The middle tier server (MTS) is typically a web server such as the IBM Internet Connection Server, the Lotus Domino Server, the Netscape SuiteSpot server, or the Microsoft Internet Server. Middle tier servers could also include a Java Server (Java is a trademark of Sun Microsystems, Inc.) based on the RMI interface, a connection broker implementing the Object Management Group (OMG) Common Object Request Broker Architecture (CORBA) standard, or other intermediate server. The middle tier server acts as an intermediary brokering requests from the user to the enterprise resource. Secure access to the enterprise resource requires that the middle tier server be able to execute enterprise resource requests on behalf of another identified user. While this discussion focuses on a three tier architecture, installations with four or more tiers could be employed with authentication mapping and credential transform being employed between a server and the next downstream resource. Such architectures are within the scope of the present invention.

The middle tier server according to the present invention accesses resources on behalf of a client by mapping the credentials used to access the server into credentials for accessing the resource. Credential mapping includes two parts: id mapping and credential transform.

Id mapping is the process of converting one authentication id into another id. For example, a client may access the server using id client1. The client may be requesting data stored on a first enterprise resource. The client must have an authentication identifier for that resource, e.g. ERID5. Id mapping is the process of determining that client1 is mapped to ERID5 for access to the first enterprise resource.

Credential transform is the process of locating and using the credentials for the mapped ID. Thus, in the above example, ERID5, will have a password required for access to the first enterprise resource. This password must be maintained securely and be accessible only after the client has properly authenticated with the middle tier server. The second step is therefore to take the mapped id, and, if properly authorized, use it to access the necessary credentials. The original client request is finally modified to incorporate the transformed credentials for access to the enterprise resource.

The files mapping client ids to resource ids and containing credentials must be strictly controlled to preserve system security. An administrator with specific authority will maintain these server files in the preferred embodiment. Once authorized, the client may be given limited authority to maintain his or her mapping or credential files. In other cases, the clients will be prevented from accessing any of the server mapping files.

FIG. 1 illustrates the preferred embodiment of the present invention. A client 102 executing a commercial browser 104 makes a request 105 for certain data. The request passes through the internet (or simple network) 106 and is presented to the web server software 122 executing in middle tier server 120. The middle tier server 120 detects a request for resource access and first authenticates the user using user supplied credentials or client certificate. The middle tier server authenticates the user to determine whether or not the user is authorized to access the id map/credential transform data. In the preferred embodiment, the middle tier server authenticates the user using its preferred authentication mechanism 126 then it passes the user identity to the credential transformer 124. The id map is accessed using the middle tier server identifier. Authentication manager 126 authenticates the user by accessing authentication data 130. In an alternate embodiment, client authentication is performed by an external security server 132 such as the IBM Distributed Security Services (DSS) server, or other Distributed Computing Environment (DCE) based server. One advantage of the present invention is enabling the use of DCE security without the overhead of installing the large DCE software client on each workstation. The server can manage DCE security as shown.

The server next determines the enterprise resource for which access is requested and causes credential transformer 124 to attempt to map the authenticated user id to an id for the enterprise resource using id map file 134. Mapping is performed by an extension to the authentication manager 128. The credential transformer 124 next retrieves the mapped id authentication token or password. The tokens or passwords are maintained by personal key manager 136. The personal keys are preferably stored in a persistent key repository 138 maintained by the system administrator.

Access to an enterprise resource requires authentication with that resource. The access manager 128 invokes a secondary logon mechanism 140 specific to that resource. Once authenticated, the original client request will be forwarded 150 to the enterprise resource (not shown) for action.

The present system has the advantage of requiring the client to authenticate once with the web server instead of requiring multiple logons with each enterprise resource. The administrator controls the access permitted by each client. In certain situations the administrator can enable access to enterprise resources only through the web server. The client user will receive authorization, but will not know or be able to use through any other channel, the id and password that authorizes their access to the resource.

Figure 3:
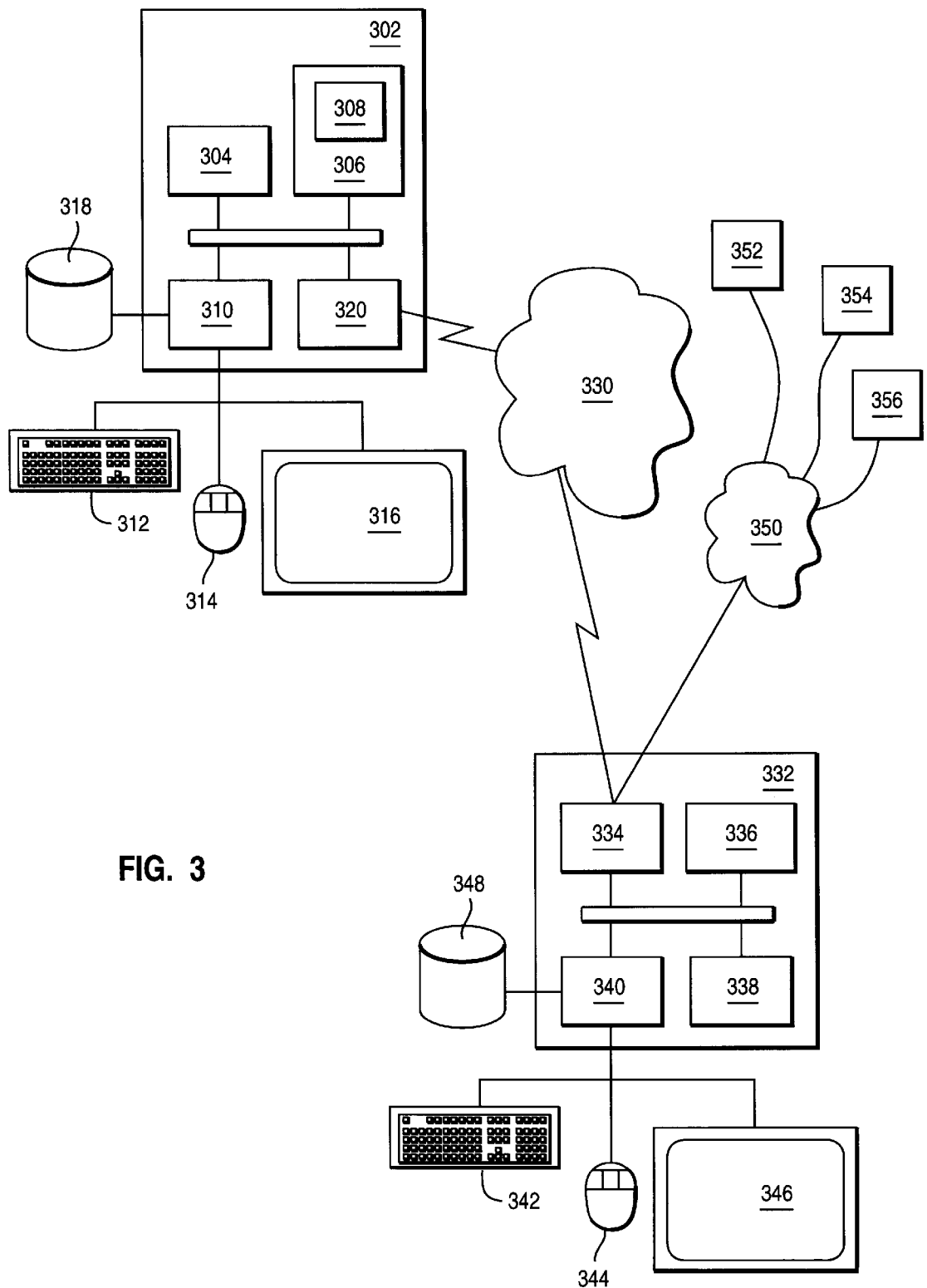
FIG. 3 is a block diagram of a computer network system according to the present invention.

The present invention is practiced using computer hardware systems such as that shown in FIG. 3. Client workstations 302 can be any of a variety of workstations based on Intel or other processors and executing under the control of an operating system such as IBM OS/2, IBM AIX, Microsoft Windows 95, Sun Solaris or as a network computer (NC) running a Java Virtual Machine or JAVAOS (Java and JavaOS are trademarks of Sun Microsystems, Inc.) The client workstation includes one or more processors (CPUs) 304 and memory 306. A browser program 308 operates from the memory. Access to external devices such as a keyboard 312, a display unit 316, pointing device 314, and optionally a fixed or removable storage device 318 is provided through input/output controller 310. Network controller 320 manages interaction with network 330 using common protocols such as TCP/IP over ethernet, token ring or other network transports.

Web server 332, contains a network controller 334, memory 338, and one or more processing units 336. Server function can be provided by a single server, by a symmetric multiprocessor configuration (SMP) or by a clustered web server configuration. Web server 332 includes an input/output controller 340 for accessing keyboard 342, display 346, and pointing device 344, as well as permanent storage 348. Finally, the web server accesses enterprise resources 352, 354, 356 over network 350. Network 350 is preferably distinct from client network 330, by being, for example, inside a firewall. However, a single network shared by both the clients and enterprise resources could be employed without departing from the spirit or scope of the invention.

The present invention is implemented by defining additional application programming interfaces (APIs) to the authentication manager of a web server. These APIs allow the administrator to control the id mapping and credential transform process and to maintain the personal key table. The APIs also support credential mapping invocation according to the present invention. The preferred embodiment comprises program logic loadable into a web server for extending authentication management functions to include id mapping and credential transform. This program logic operates through the added APIs to interact with the web server.

Secondary enterprise resource authorization is accomplished through secondary login mechanism 140. The defined APIs permit additional secondary logon logic for new or different enterprise resources to be easily added by developing and loading program logic for that logon.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A middle-tier server (MTS) with facilities for automatically authenticating a request for a protected upper-tier resource, said MTS comprising:

an input facility that receives a request from a user at a lower-tier client requiring access to at least one upper-tier resource;

a first application program interface (API) that performs middle-tier authentication;

a second API that performs upper-tier authentication; and a server program that:

utilizes said first API to associate a middle-tier user credential with said request if no middle-tier user credential is associated with said request;

utilizes said second API to associate an upper-tier user credential with said request if said middle-tier user credential is associated with said request and no upper-tier user credential is associated with said request; and utilizes said upper-tier user credential to access said at least one upper-tier resource if said middle-tier user credential and said upper-tier user credential are associated with said request and then returns a response from said upper-tier resource to said lower-tier client.

2. A middle-tier server (MTS) according to claim 1, wherein said first application program interface (API) comprises an authentication manager that includes:

means for prompting said user for a middle-tier user identifier and a middle-tier user token;

means for authenticating said request based on authentication data for said MTS, said middle-tier user identifier, and said middle-tier user token;

means for rejecting said request if said middle-tier authentication fails; and means for associating said middle-tier user credential with said request if said middle-tier authentication succeeds.

3. A middle-tier server (MTS) according to claim 2, wherein said second application program interface (API) comprises an access manager that includes:

means for mapping said middle-tier user identifier to an upper-tier user identifier and to a corresponding upper-tier user token for each at least one upper-tier resource;

means for authenticating said request based on authentication data for each at least one upper-tier resource and based on each corresponding upper-tier user identifier and upper-tier user token;

means for rejecting said request if said upper-tier authentication fails; and means for associating said upper-tier user credential with said request if said upper-tier authentication succeeds.

4. A middle-tier server (MTS) according to claim 3, wherein:

said MTS has at least first and second security levels;

said user is a first user with said second security level; and further comprising:

means for allowing said first user to store and modify one or more of said upper-tier user tokens of said first user;

means for allowing a second user with said first security level to store and modify one or more of said upper-tier user tokens of said first user; and means for preventing a third user with said second security level from storing and modifying any of said upper-tier user tokens of said first user.

5. A middle-tier server (MTS) according to claim 3, wherein said means for authenticating said request based on authentication data for said at least one upper-tier resource comprises:

means for invoking a secondary logon mechanism associated with said at least one upper-tier resource; and means for passing said upper-tier user identifier and said upper-tier user token to said secondary logon mechanism without prompting said user for said upper-tier user identifier and without prompting said user for said upper-tier user token.

6. A middle-tier server (MTS) according to claim 5, wherein said server program comprises a web server program.

7. A middle-tier server (MTS) according to claim 1 further comprising a security application program interface (API) that includes said first API and said second API.

8. A method in a middle-tier server for automatically authenticating a request for a protected upper-tier resource, said method comprising:

receiving, at server software executing on a middle-tier server (MTS), a request from a user at a lower-tier client requiring access to at least one upper-tier resource;

if no middle-tier user credential is associated with said request, associating said middle-tier user credential with said request by utilizing a first application program interface (API) of said MTS to perform middle-tier authentication of said request;

if said middle-tier user credential is associated with said request and no upper-tier user credential is associated with said request, associating said upper-tier user credential with said request by utilizing a second API of said MTS to perform upper-tier authentication of said request; and if said middle-tier user credential and said upper-tier user credential are associated with said request, utilizing said upper-tier user credential to access said at least one upper-tier resource and, thereafter, returning a response from said upper-tier resource to said lower-tier client.

9. A method according to claim 8, wherein said step of utilizing said first application program interface (API) to perform middle-tier authentication comprises:

prompting said user for a middle-tier user identifier and a middle-tier user token;

authenticating said request based on authentication data for said middle-tier server (MTS), said middle-tier user identifier, and said middle-tier user token;

rejecting said request if said middle-tier authentication fails; and associating said middle-tier user credential with said request if said authentication succeeds.

10. A method according to claim 9, wherein said step of utilizing said second application program interface (API) to perform upper-tier authentication comprises:

mapping said middle-tier user identifier to an upper-tier user identifier and to a corresponding upper-tier user token for each at least one upper-tier resource;

authenticating said request based on authentication data for each at least one upper-tier resource and based on each corresponding upper-tier user identifier and upper-tier user token;

rejecting said request if said upper-tier authentication fails; and associating said upper-tier user credential with said request if said upper-tier authentication succeeds.

11. A method according to claim 10, said middle-tier server (MTS) having at least first and second security levels, wherein:

said user is a first user with said second security level; and said method further comprises:

allowing said first user to store and modify one or more of said upper-tier user tokens of said first user;

allowing a second user with said first security level to store and modify one or more of said upper-tier user tokens of said first user; and preventing a third user with said second security level from storing and modifying any of said upper-tier user tokens of said first user.

12. A method according to claim 10, wherein said step of authenticating said request based on authentication data for each at least one upper-tier resource comprises:

invoking a secondary logon mechanism associated with said at least one upper-tier resource; and passing said upper-tier user identifier and said upper-tier user token to said secondary logon mechanism without prompting said user for said upper-tier user identifier and without prompting said user for said upper-tier user token.

13. A method according to claim 8, wherein said server software comprises a web server program.

14. A method according to claim 8, wherein said middle-tier server (MTS) utilizes a security application program interface (API) that includes said first API and said second API to perform said middle-tier authentication and said upper-tier authentication.

15. A program product that enables a middle-tier server (MTS) to authenticate a request for a protected upper-tier resource automatically, said program product comprising:

an input facility that receives a request from a user at a lower-tier client requiring access to at least one upper-tier resource;

a first application program interface (API) that performs middle-tier authentication;

a second API that performs upper-tier authentication;

a server program that:

utilizes said first API to associate a middle-tier user credential with said request if no middle-tier user credential is associated with said request;

utilizes said second API to associate an upper-tier user credential with said request if said middle-tier user credential is associated with said request and no upper-tier user credential is associated with said request; and utilizes said upper-tier user credential to access said at least one upper-tier resource if said middle-tier user credential and said upper-tier user credential are associated with said request and then returns a response from said upper-tier resource to said lower-tier client; and a computer usable medium encoding said input facility, said first API, said second API, and said server program.

16. A program product according to claim 15, wherein said first application program interface (API) comprises an authentication manager that includes:

means for prompting said user for a middle-tier user identifier and a middle-tier user token;

means for authenticating said request based on authentication data for said middle-tier server (MTS), said middle-tier user identifier, and said middle-tier user token;

means for rejecting said request if said middle-tier authentication fails; and means for associating said middle-tier user credential with said request if said middle-tier authentication succeeds.

17. A program product according to claim 16, wherein said second application program interface (API) comprises an access manager that includes:

means for mapping said middle-tier user identifier to an upper-tier user identifier and to a corresponding upper-tier user token for each at least one upper-tier resource;

means for authenticating said request based on authentication data for each at least one upper-tier resource and based on each corresponding upper-tier user identifier and upper-tier user token;

means for rejecting said request if said upper-tier authentication fails; and means for associating said upper-tier user credential with said request if said upper-tier authentication succeeds.

18. A program product according to claim 17, wherein:

said middle-tier server (MTS) has at least first and second security levels;

said user is a first user with said second security level; and said program product further comprises:

means for allowing said first user to store and modify one or more of said upper-tier user tokens of said first user;

means for allowing a second user with said first security level to store and modify one or more of said upper-tier user tokens of said first user; and means for preventing a third user with said second security level from storing and modifying any of said upper-tier user tokens of said first user.

19. A program product according to claim 17, wherein said means for authenticating said request based on authentication data for said at least one upper-tier resource comprises:

means for invoking a secondary logon mechanism associated with said at least one upper-tier resource; and means for passing said upper-tier user identifier and said upper-tier user token to said secondary logon mechanism without prompting said user for said upper-tier user identifier and without prompting said user for said upper-tier user token.

20. A program product according to claim 15, wherein said server program comprises a web server program.

21. A program product according to claim 15, wherein said computer usable medium encodes a security application program interface (API) that includes said first API and said second API.

* * * * *